United States Patent
Vance et al.

(10) Patent No.: US 10,310,795 B1
(45) Date of Patent: Jun. 4, 2019

(54) PASS-THROUGH CONTROL IN INTERACTIVE DISPLAYS

(71) Applicant: Layer Logic, Inc., Mason, OH (US)

(72) Inventors: Phillip Scott Vance, West Chester, OH (US); Andrew Dahlinger, Mason, OH (US); Justin Rich, Miamisburg, OH (US)

(73) Assignee: Layer Logic, Inc., Mason, OH (US)

( * ) Notice: Subject to any disclaimer, the term of this patent is extended or adjusted under 35 U.S.C. 154(b) by 0 days.

(21) Appl. No.: 15/870,829

(22) Filed: Jan. 12, 2018

Related U.S. Application Data

(60) Provisional application No. 62/462,666, filed on Feb. 23, 2017.

(51) Int. Cl.
*H04N 5/445* (2011.01)
*G06F 3/14* (2006.01)
*H04N 5/44* (2011.01)

(52) U.S. Cl.
CPC ......... *G06F 3/1423* (2013.01); *H04N 5/4403* (2013.01); *H04N 2005/443* (2013.01)

(58) Field of Classification Search
CPC .................................................. H04N 5/4403
USPC ............................................................ 725/59
See application file for complete search history.

(56) References Cited

U.S. PATENT DOCUMENTS

| 8,381,245 B2 * | 2/2013 | Stallings | H04N 5/4403 715/716 |
| 8,510,780 B2 * | 8/2013 | Stallings | H04N 5/4403 725/39 |
| 8,893,184 B2 * | 11/2014 | Ferren | G06F 13/00 725/44 |
| 2006/0031889 A1 * | 2/2006 | Bennett | H04L 29/06027 725/80 |

\* cited by examiner

*Primary Examiner* — Michael B. Pierorazio

(57) ABSTRACT

Systems, methods and computer readable media for pass-through control in interactive displays are provided. The systems presented herein can be used for allowing the display and interaction of distributed content from various sources to one or more displays. In some embodiments of the disclosed subject matter, a system for pass-through control in interactive display devices comprises, one or more display screens, one or more touch input devices, a plurality of video sources and a video processor capable of processing, synchronizing and controlling touch requests for displaying video signals originating from a multitude of video sources.

19 Claims, 17 Drawing Sheets

PASS-THROUGH CONTROL IN INTERACTIVE DISPLAYS

CROSS-REFERENCE TO RELATED APPLICATIONS

This application claims the benefit of U.S. Provisional Application Ser. No. 62/462,666, filed Feb. 23, 2017, the contents of which are herein incorporated by reference in its entirety.

FIELD OF THE INVENTION

The disclosed subject matter relates to systems, methods and computer readable media for pass-through control in interactive displays.

BACKGROUND OF THE INVENTION

The advances in video walls and interactive displays, together with the increasing expansion of communication networks allowing higher throughputs and bandwidth for the transmission of audio/video data, have enabled higher resolution screens to become more prevalent in different environments. A variety of displays manufactured using different technologies, such as flat-panel displays, are increasingly used in both indoor and outdoor settings. Such displays provide human-device interactivity using, for example, touch-enabled functionality. Examples of such interactive displays are used in connection with information sharing and service rendering in both public and private situations.

However, in certain cases, such applications are based on a centralized system architecture whereby the displayed data is stored in a content server and the user is limited in requesting existing data by interacting with the display. Further, in other instances, even if one or more users are able to provide content data for display by either connecting a device, e.g., a mobile phone, to the display and/or having access to the content server, the interactive display system remains content centralized and allocates users with a dedicated portion of the interactive display.

Touchscreen input devices, whether integrated with or overlaid on top of a display configuration, typically have been limited to a one-to-one relationship with a PC or screen. These touch input devices typically have one physical USB connection that is connected to one PC at a time. The connected PC's video signal is shown full-screen on the display, and touch input is passed to the PC over the USB connection using the HID protocol for a given PC's operating system.

Current interactive display system lack the capacity to be used in a content-distributed manner while allowing interaction among multiple users.

Thus, there remains a continued need for a system, method and computer readable media for pass-through control in interactive displays that allows for the use of the display by multiple users.

SUMMARY OF THE INVENTION

The disclosed subject matter provides techniques for pass-through control in interactive display devices. An example system includes one or more display screens configured to receive and display a video signal and one or more input devices coupled to the one or more display screens and configured to receive at least one input, which may be tactile, voice, verbal, algorithmic, an alternate method, or some combination thereof. As a non-limiting example, a tactile input can be a touch, tap or any other suitable input by a user. The system also includes a plurality of video sources configured to generate a plurality of video signals and one or more video processors coupled to one or more of the plurality of video sources and the one or more display screens. The video processor is configured to determine whether a video source from the video sources is associated with the at least one input, and upon such determination, generate a combined video signal based, at least in part, on the at least one input and the plurality of video signals and transmit the combined video signal to the one or more display screens.

In accordance with another aspect of the disclosed subject matter, methods for pass-through control in interactive display devices are provided. Example methods include receiving, at a video processor, at least one tactile, voice, verbal, algorithmic, or alternate input from one or more touch-input devices, and determining whether a video source from a plurality of video sources coupled to the video processor is associated with the at least one input. Upon said determination, one or more commands associated with the at least one input are transmitted to the video source, and a video signal associated with the video source is received for display on one or more display screens coupled to the video processor.

It is to be understood that both the foregoing general description and the following detailed description and drawings are examples and are provided for purpose of illustration and not intended to limit the scope of the disclosed subject matter in any manner.

The accompanying drawings, which are incorporated in and constitute part of this specification, are included to illustrate and provide a further understanding of the devices of the disclosed subject matter. Together with the description, the drawings serve to explain the principles of the disclosed subject matter.

BRIEF DESCRIPTION OF THE DRAWINGS

The subject matter of the application will be more readily understood from the following detailed description when read in conjunction with the accompanying drawings, in which.

DETAILED DESCRIPTION

Figure 1:
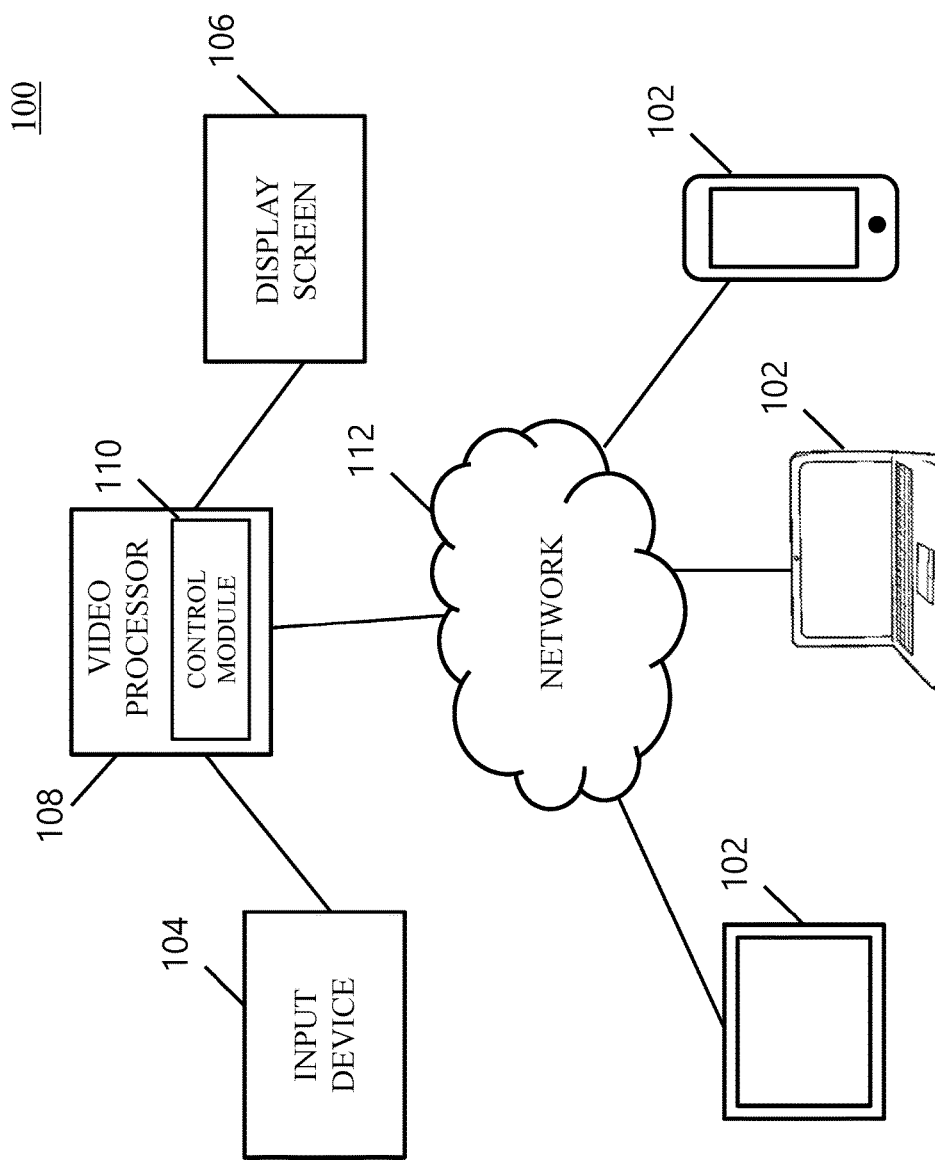
FIG. 1 is a block diagram of an example system for pass-through control in interactive displays.

As disclosed herein, systems, methods and computer readable media are presented herein for pass-through control in interactive displays. The systems presented herein can be used for allowing the display and interaction of distributed content from various sources to one or more displays. The disclosed systems include one or more display screens that are coupled to respective interactive input devices, including, but not limited to, touch screens, touch overlays, voice inputs, text inputs, or some combination thereof. In addition, the disclosed systems are configured to be coupled to a plurality of video sources such as computers, mobile devices, tablets or any other suitable device that are capable of furnishing one or more video signals for displaying on to the one or more display screens. The processing and controlling of such video signals can be accomplished by a video processor and/or a pass-through control device coupled to the plurality of video sources and the one or more displays. For example, a pass-through controller device can be coupled to the plurality of video sources using a wired and/or wireless connection.

In accordance with the disclosed subject matter, an example system for pass-through control in interactive display devices includes one or more display screens, one or more touch or alternate input devices, a plurality of video sources and a video processor that includes a control module. Specifically, the one or more display devices are configured to receive and display a video signal. For example, in some embodiments the video signal can be displayed on a portion of the display or the entire surface area of the display.

Moreover, the one or more displays can be coupled to one or more touch or alternate input devices and configured to receive at least one tactile or alternate input from one or more users. As non-limiting examples, a tactile input can be a touch, tap or any other suitable input, while an alternate input can be a text, voice, or algorithmic input. Such tactile inputs can, for example, be performed sequentially and/or simultaneously causing the one or more displays to provide different content e.g., audio, image, video from a plurality of video sources. For example, the video sources can generate a plurality of video signals and include a suitable device such as a personal computer, laptop, tablet, mobile device etc.

In order to achieve the pass-through control of the video sources to the one or more interactive displays, one or more video processors are coupled to one or more of the plurality of video sources and the one or more display screens. The video processor can determine, among other things, whether a video source from the plurality of video sources is associated with the tactile inputs, and upon such determination, synchronize and generate a combined video signal based, at least in part, on the at least one tactile input and the different video signals and transmit the combined video signal to the one or more display screens.

Solely for purpose of illustration, an exemplary embodiment of a block diagram illustrating a system for pass-through control in interactive displays, is shown schematically in FIG. 1. The examples herein are not intended to limit the scope of the disclosed subject matter in any manner. Particularly, and as illustrated, system 100 is shown having video sources 102. For example, such video sources can include laptop 102, mobile device 102 and/or tablet 102 or any suitable combination thereof capable of generating and/or transmitting a video signal. In some embodiments, video sources 102 can generate multiple multimedia signals e.g., audio, image, video etc. and can be associated to a single or multiple users. In addition, system 100 can include one or more touch or alternate-input device(s) 104 and display screen(s) 106. In some embodiments, touch or alternate-input device 104 can be embedded into display screen 106 or electrically coupled to using any suitable connector such as electrodes, an LED matrix, pins or any suitable combination thereof.

In addition, touch or alternate-input device 104 can be manufactured using a suitable input technology such as Infrared (IR), capacitive sensing and/or inductive sensing. In some embodiments, input device 104 is a touch-input device that incorporates a display. Furthermore, display screen 106 can be any suitable flat screen such as light-emitting diode (LED), organic LED (OLED), plasma screen or any other suitable screen capable of displaying video signals. System 100 also includes video processor 108. In some embodiments video processor 108 can be a general purpose computer, server and/or a special-purpose hardware processor or any suitable combination thereof. In some embodiments, video processor 108 can include a control module 110. Control module 110 can include application specific hardware, specialized software and/or any suitable combination thereof. Specifically, in some embodiments, video processor 108 and control module 110 receive one or more video signals from video sources 102, synchronize those signals, and generate a combined video signal using different permutations and layouts onto a single continuous raster.

In some embodiments, the video processor 108 can be a separate hardware device and/or can be embedded into the one or more display screens. As illustrated in system 100, video sources 102 and video processor 108 are coupled using network 112 in order to transmit, receive and subsequently control the display of the one or more video signals originating from video sources 102. In some embodiments, network 112 can be any suitable wired or wireless network, including, but not limited to, LAN, WLAN, WiFi, Bluetooth, Ethernet, Near Field Communication (NFC) or any suitable combination thereof. Furthermore, in some embodiments, touch-input device 104, display screen 106 and video processor 108 can be coupled using wired connections, including, but not limited to, HDMI, DVI or any other suitable video connector. In some embodiments, one or more of video sources 102, touch-input device 104, display screen 106 and video processor 108 can be connected directly via wired connections. For example, video processor 108 can be connected directly to one or more video sources 102 using any suitable connector such as USB, VGA, HDMI or any suitable combination thereof.

Figure 2:
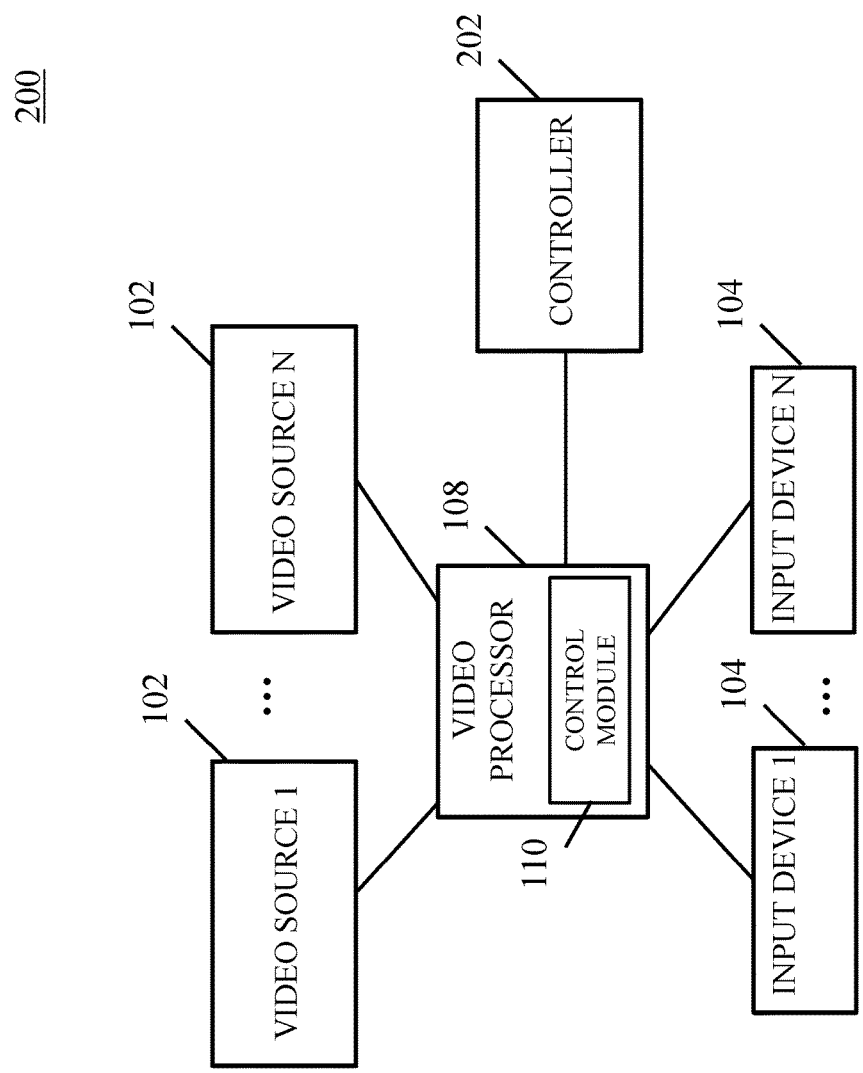
FIG. 2 is a block diagram of an alternate system for pass-through control.

FIG. 2 shows a block diagram for an alternate embodiment of system 200 for pass-through control in interactive displays. Specifically, as discussed in reference to FIG. 1, system 200 includes video sources 102 (e.g., Video Source 1, . . . Video Source N) adapted for generating one or more video signals for display onto touch or alternate-input devices 104 (e.g., Input Device 1, . . . Input Device N). In some embodiments, one or more of input devices 104 are touch-input devices that can sense, measure and transform a user's tactile input into a command such as a request for content from one of the video sources 102. In addition, in some embodiments, the video signals from video sources 102 and tactile input from touch-input devices 104 is processed at video processor 108, for example within control module 110, in order to determine and synchronize the video signals with the tactile input.

For example, in some embodiments, determining that an input is a tactile input that corresponds to requesting a video signal from video source 102 can cause the control module 108 within video processor 108 to transmit gesture information to controller 202 in order to provide pass-through control to the video source 102. Furthermore, in some embodiments, if the video processor 108 determines that the tactile input does not correspond to video source 102 then the video processor 108 can activate one or more system commands displayed onto displays 106. In some embodiments, controller 202 can be a hardware device such as a Human-Interaction Device (HID) controller or any other suitable microcontroller capable of receiving tactile or alternate input and generating data structures associated with the tactile or alternate input, including, as a non-limiting example, gesture reports. In some embodiments, controller 202 can be integrated into video sources 102.

Figure 3:
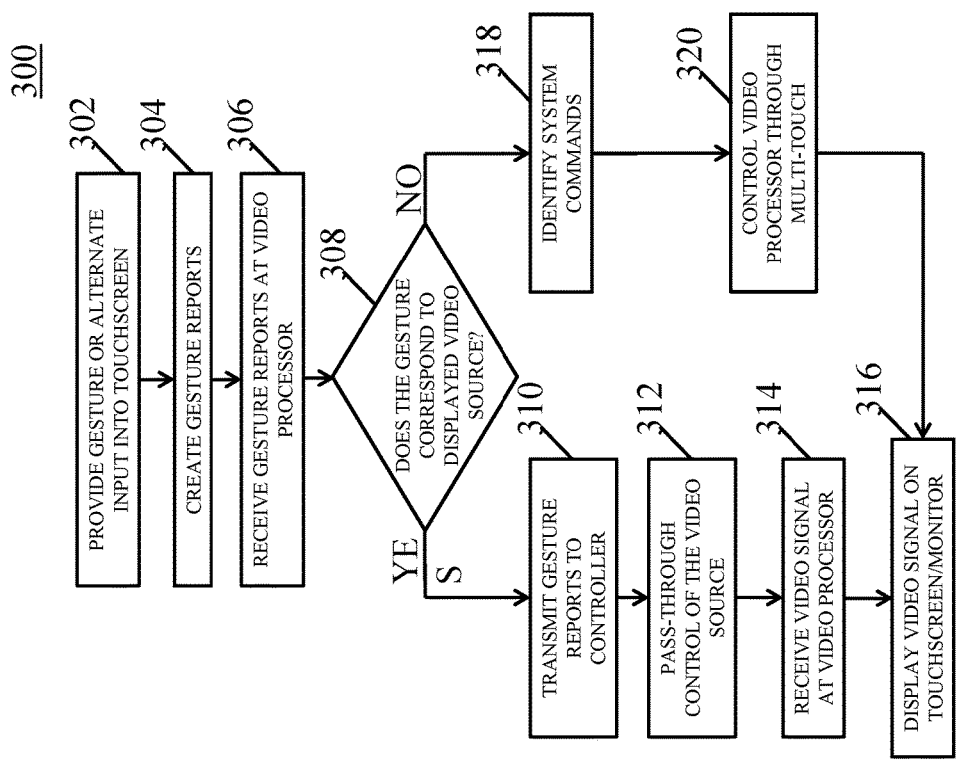
FIG. 3 illustrates an example process for pass-through control in interactive displays.

Solely for purpose of illustration, reference is made to FIG. 3 showing an example process 300 for performing pass-through control in interactive displays. Specifically, at 302 one or more users can interact with input device 104 by providing a tactile or alternate input e.g., tap, touch, text, voice etc. In certain embodiments, the input device 104 creates an initial gesture report providing information regarding the tactile input, at 304. For example, in some embodiments such information can include coordinates of the tactile input, intensity, pressure level or any other suitable information regarding the user's tactile input. In certain embodiments, at 306, the gesture reports are received at the video processor 108 in order for control module 110 to determine whether the user's tactile input corresponds to an existing signal, including, but not limited to, an already displayed video signal originating from video source 102. If, at 308, video processor 108 determines that an input is attributed to a video source 102 (e.g., "YES" at 308) then the video processor 108 transmits reports to controller 202, at 310. Upon receiving gesture reports, controller 202 activates pass-through control of video source 102 at 312 and transmits the corresponding video signal to the video processor 108 at 314 in order for video processor 108 to generate a combined video signal and create a continuous raster that is transmitted and displayed on the display screen 106, at 316.

If, however, video processor 108 determines, at 308, that the input is not associated with any video source 102 (e.g., "NO" at 308) then video processor 108 identifies and activates system commands at 318 that provide control of video processor 108 through multi-touch, at 320. In some embodiments, such system commands can include displaying an options menu, configuration menu or any other suitable system menu. In some embodiments, system commands can be applied using zooming, panning, pinching, scaling and/or any other suitable gesture applied, through input device 104, on objects displayed on display screens 106.

Figure 4:
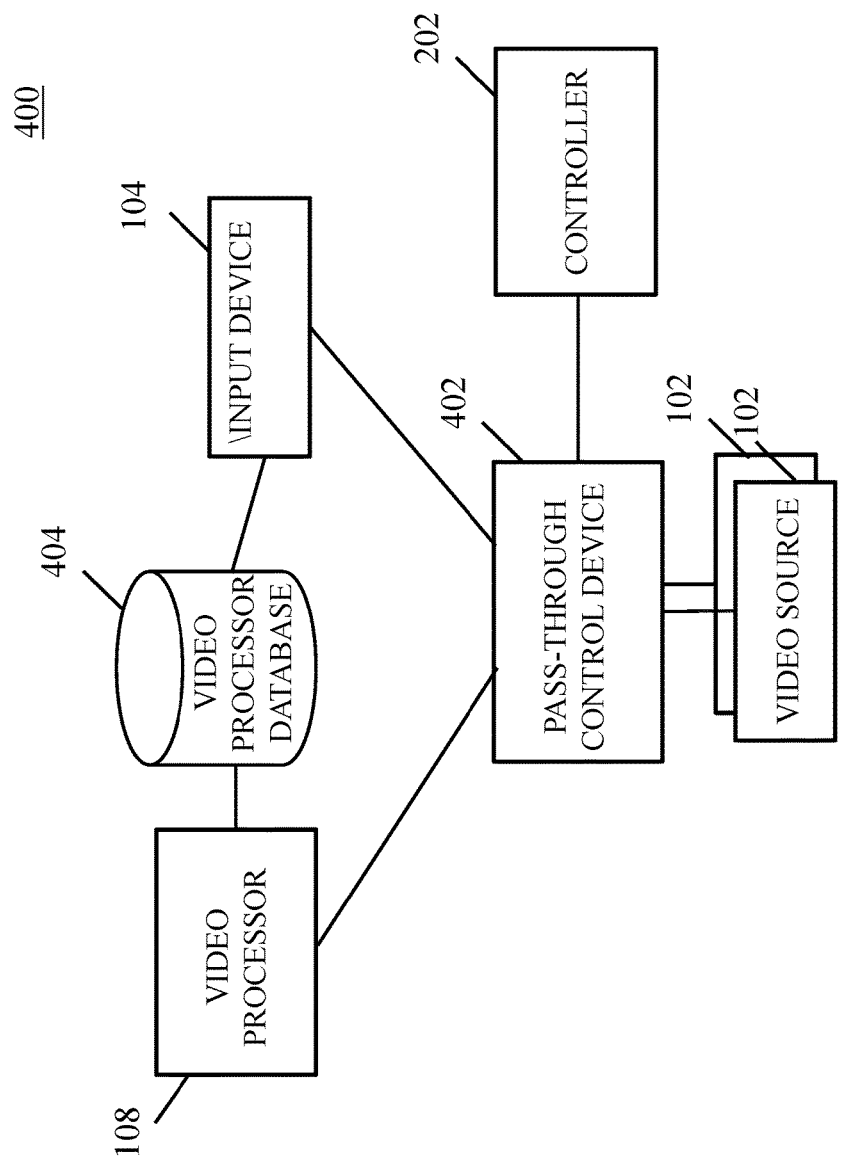
FIG. 4 is a block diagram of an alternate system for pass-through control in interactive displays.

FIG. 4 shows a block diagram of an alternate system in accordance with some embodiments of the disclosed subject matter. Specifically, system 400 includes input device 104 such that one or more users can provide a tactile or alternate input in order to display one or more video signals originating from video sources 102. System 400 includes pass-through control device 402 connected to video source 102 and controller 202. In some embodiments, pass-through control device can be a general purpose and/or specialized hardware processor capable of processing and synchronizing one or more video signals originating from video sources 102. Specifically, pass-through control device 402 can determine whether a user's tactile or alternate input is associated with one or more video sources 102 and provides synchronization information based on the determination, to controller 202 and video processor 108. Video processor 108 retrieves and/or stores the incoming video signals from video sources 102 and subsequently transmits the video signals to input device 104. In some embodiments, providing a pass-through control device 402 allows for applying pass-through control on a multitude of existing interactive displays without necessitating additional hardware and/or software changes and updates, thus providing system flexibility and effectiveness.

Figure 5:
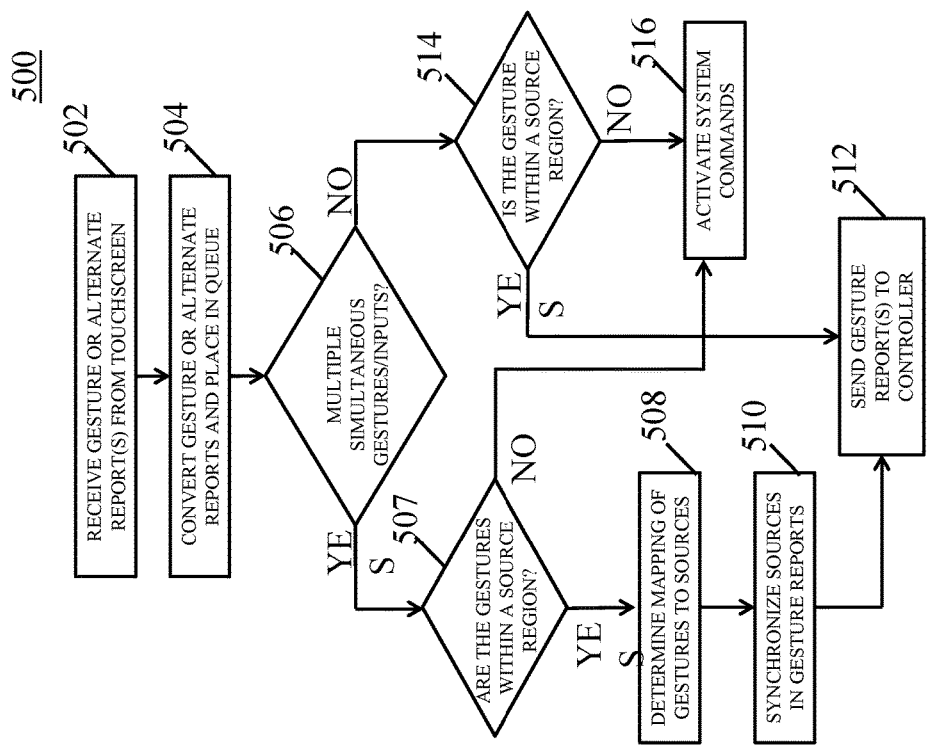
FIG. 5 illustrates an example process in reference to the system of FIG. 4 for pass-through control in interactive displays.

Solely for purpose of illustration, reference is made to FIG. 5 showing an example process 500 for synchronizing video sources 102 for pass-through control in interactive displays, using pass-through control device 402. In some embodiments, process 500 can be employed using video processor 108 including control module 110. Specifically, in certain embodiments at 502 pass-through control device 402 receives one or more gesture reports including parameters of users tactile inputs. In alternate embodiments, reports may include text, voice, algorithmic, or other inputs. In some embodiments, such parameters can include coordinated inputs, gesture identification, text or voice identification, and/or any other suitable parameter. In certain embodiments, at 504, the gesture reports are converted into TCP/IP packets for transmission through network 112 and placed in a queue. In some embodiments, the gesture reports are ordered in the queue based on the timing of the interaction and the number of tactile inputs. At 506, the pass-through control device 402 determines, through the gesture reports, whether there were multiple simultaneous gestures employed onto one or more interactive displays.

If the pass-through control device 402 determines that there were multiple simultaneous gestures or alternate inputs (e.g., "YES" at 506) then pass-through control device 402 determines at 507 whether the multiple simultaneous inputs are within a region of a video source on the touch-input display. If the pass-through control device 402 determines that the gestures or alternate inputs are within a source region (e.g., "YES" at 507) then it determines a mapping of the inputs in the gesture reports to the one or more video sources 102, at 508. Subsequently, at 510, pass-through control device 402 synchronizes video sources 510 by generating and/or updating the gesture reports indicating the synchronization. At 512, the synchronized gesture reports are transmitted to the controller 202 that can subsequently transmit control commands to video sources 102 based on the synchronized gesture reports. If, at 507 the pass-through control device 402 determines that the simultaneous gestures or alternate inputs are not within a region on the touchscreen display that corresponds to a video source (e.g., "NO" at 507) then pass-through control device 402 activates system commands at 516. In some embodiments, such system commands can include displaying an options menu, configuration menu or any other suitable system menu. In some embodiments, system commands can be triggered using zooming, panning, pinching and/or any other suitable gesture applied, through touch-input display 104, on objects displayed on touch-input display 104 and/or display screen 106.

If, however, at 506 pass-through control device 402 determines that there are no simultaneous gestures applied on the interactive display (e.g., "NO" at 506) then a determination is made, at 514, by pass-through control device 402 to ascertain whether the user's tactile or alternate input, including, but not limited to, gesture, text, or voice, is within a region of the display screen where a video signal from video source 102 is displayed. If pass-through control device 402 determines that the user's input is within a source's display region (e.g., "YES" at 514) then pass-through control device 402 transmits the gesture report to controller 202. If, however, pass-through control device 402 determines that the user's tactile or alternate input falls outside a source's display region then pass-through control device 402 activates system commands at 516. In some embodiments, such system commands can include displaying an options menu, configuration menu or any other suitable system menu. In some embodiments, system commands can be triggered using zooming, panning, pinching, text, voice, and/or any other suitable input applied, through input display 104, on objects displayed on input display 104 and/or display screen 106.

Figure 6A:
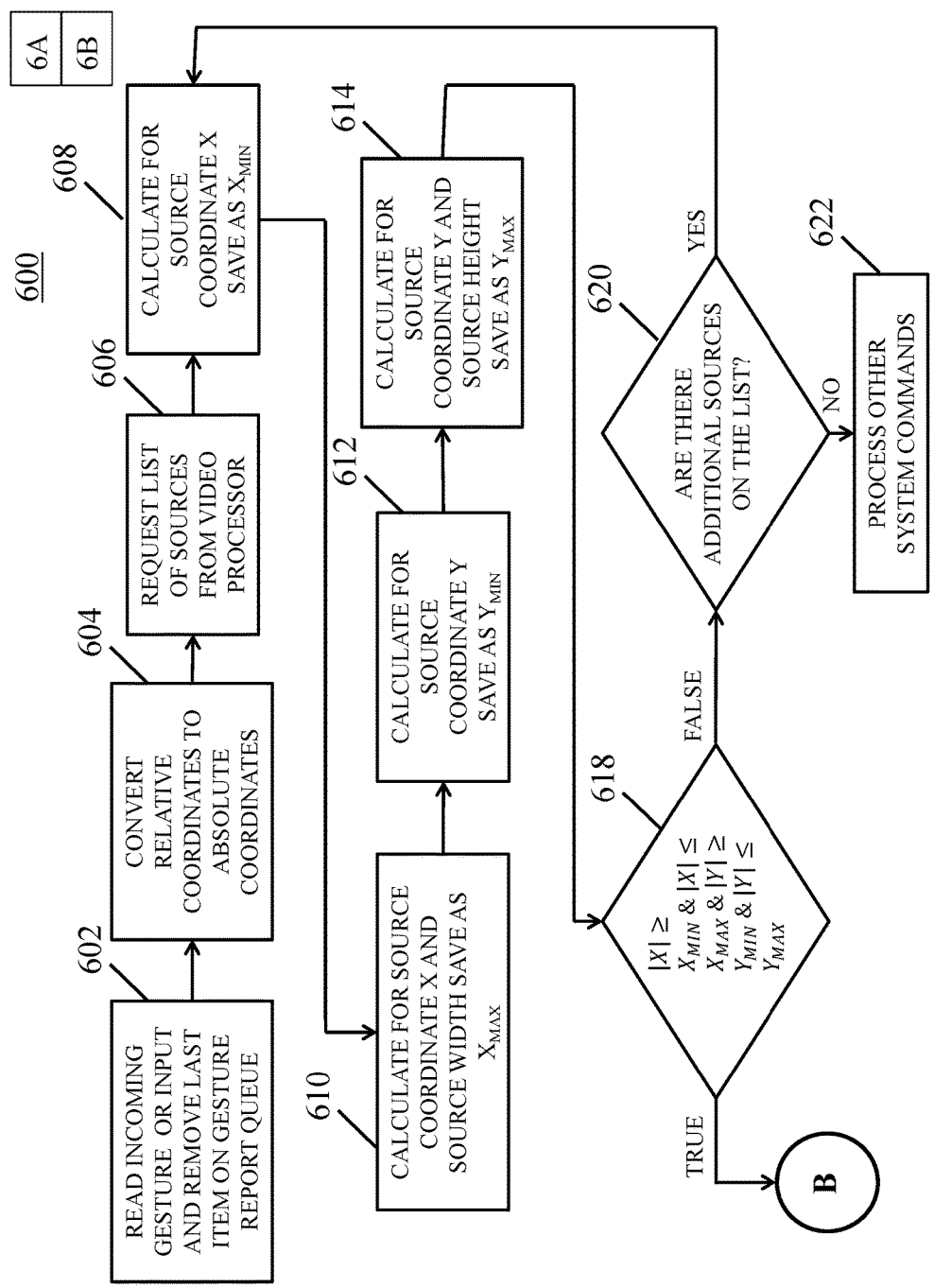
FIGS. 6A-6B illustrate an example process for processing user interactivity for pass-through control in interactive displays.
Figure 6B:
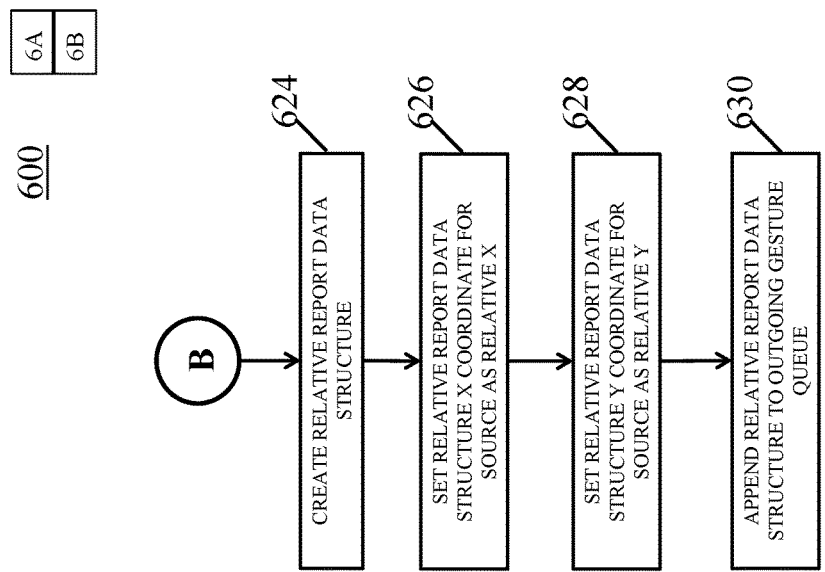

Solely for purpose of illustration, reference is made to FIGS. 6A-6B showing an example process for performing touch or alternate input processing by determining and associating a user's tactile or alternate input with one or more video sources 102 as shown in reference to FIG. 5 (element 514), in accordance with some embodiments of the disclosed subject matter. In some embodiments, process 600 shown in FIGS. 6A-6B can be achieved using video processor 108, pass-through control device 402 or by integration of pass-through control device 402 into video processor 108. Specifically, FIG. 6A shows at 602 pass-through control device 402 receiving and reading an incoming tactile input e.g., gesture such as zooming, panning, pinching, scaling and/or any other suitable gesture and removing the last item on the gesture report queue. In some embodiments, the incoming tactile input includes coordinates indicating the point of interaction on the surface of display screen 106. At 604, pass-through control device 402 proceeds to convert the relative coordinates into absolute coordinates.

Specifically, in some embodiments, the relative position of a user's tactile input refers to the position on the video source 102, while the absolute position of a user's tactile input refers to the position on the display screen 106. At 606, pass-through control device 402 requests from video processor 108 a list of video sources 102 connected to display screen 106. Following the request from the video processor, in certain embodiments at 608 pass-through control device 402 calculates for a video source 102 a horizontal coordinate, x and stores it as $x_{min}$. At 610, pass-through control device 402 calculates for a video source 102 a maximum horizontal coordinate and stores it as $x_{max}=x+width_{source}$. Similarly, at 612, pass-through control device 402 calculates for a video source 102 a vertical coordinate, y and stores it as $y_{min}$. At 614, pass-through control device 402, calculates for a video source 102 a maximum vertical coordinate and stores it as $y_{max}=y+height_{source}$. Moreover, at 618, pass-through control device 402 makes a logic determination to ascertain whether the user's tactile or alternate input falls within a video source's region on the display screen 106. In other embodiments, the system may rely on alternative calculations, computations, coordinates, and/or logic determinations.

In certain embodiments, pass-through control device 402 achieves this by evaluating the following logic expression at 618:

$$|X| \geq X_{MIN} \& |X| \leq X_{MAX} \& |Y| \geq Y_{MIN} \& |Y| \leq Y_{MAX} \quad (1)$$

Specifically, in certain embodiments, if pass-through control device 402 determines that the logical expression is false (e.g., "FALSE" at 618) and thus the user's tactile or alternate input does not fall within a region of display of video source 102, then it proceeds to determine whether there are additional video sources 102 obtained from video processor 108 at 606. If, at 620, pass-through control device 402 determines that there are additional video sources 102 listed (e.g., "YES" at 620) then process 600 returns to 608 in order to calculate the relative coordinates. If, however, it is determined that there are no additional video sources listed (e.g., "NO" at 620) then pass-through control device 402 processes other system commands at 622. Subsequently, if pass-through control device 402 determines that the logical expression is true (e.g., "TRUE" at 618) and thus the user's tactile or alternate input does fall within a region of display of video source 102, then it proceeds to create a relative report data structure at 624 (shown in FIG. 6B). Subsequently, pass-through control device 402 sets the horizontal coordinate, x of video source 102 as the relative coordinate, at 626, and stores it in the relative data structure. Similarly, at 628, pass-through control device 402 sets the vertical coordinate, y of video source 102 as the relative coordinate and stores it in the relative data structure. Moreover, at 630, pass-through control device 402 appends the relative report data structure to the outgoing gesture queue that will be received by controller 202.

Figure 7:
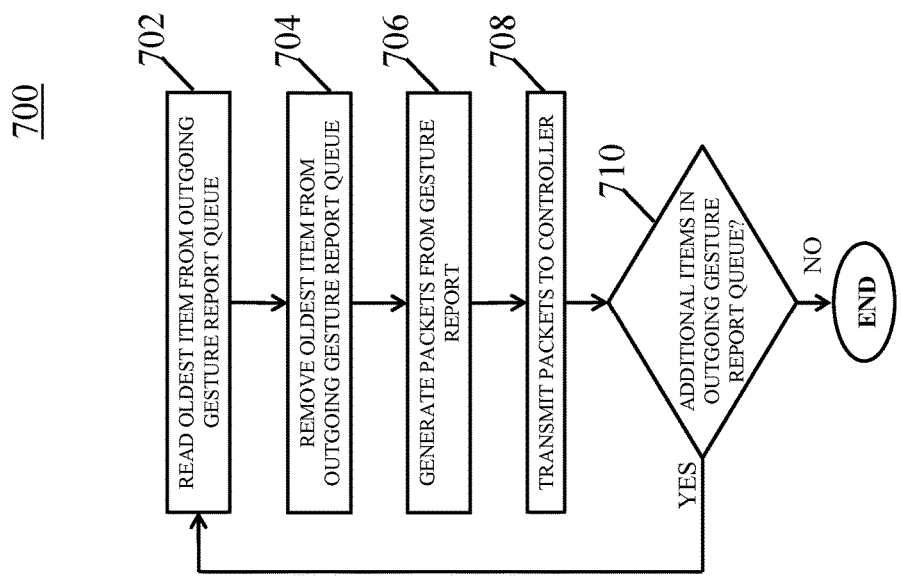
FIG. 7 illustrates an example process for transmitting user interactivity for pass-through control in interactive displays.

FIG. 7 shows a process 700 illustrating the processing and communication between video processor 108 and/or pass-through control device 402 and controller 202 for providing pass-through control in interactive displays in accordance with some embodiments of the disclosed subject matter. Specifically, in certain embodiments, at 702, video processor 108 reads the oldest item from the outgoing gesture report queue. At 704, video processor 108 removes the oldest item from the outgoing gesture report queue and generates packets from gesture report at 706 in order to facilitate transmission of the gesture report through network 112. At 708, video processor 108 transmits the packets to controller 202 and at 710 it determines whether there are additional items in the outgoing gesture report. If, at 710, it determines that there are additional items in the gesture report (e.g., "YES" at 710) then process 700 returns to 702 to read the oldest item from the outgoing gesture report. If, however, video processor 108 determines that there are no additional items in the gesture report (e.g., "NO" at 710) then process 700 terminates since tactile inputs in the outgoing gesture report has been processed.

Figure 8:
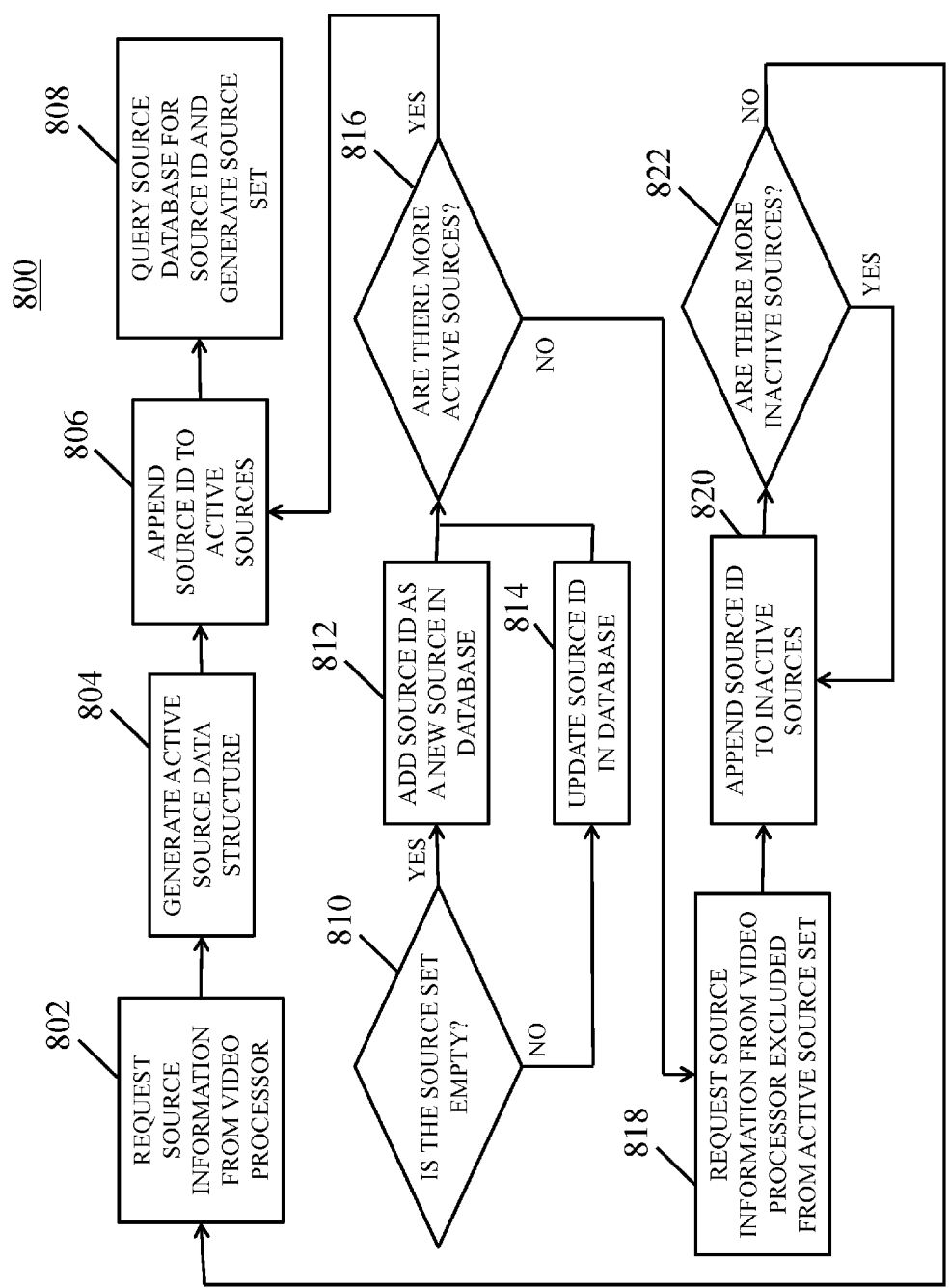
FIG. 8 illustrates an example process for synchronizing user interactivity for pass-through control in interactive displays.

Solely for purpose of illustration, reference is made to FIG. 8 showing an example process for synchronizing video sources 102 using video processor 108 and/or pass-through control device 402. Specifically, at 802, pass-through control device 402 requests video source information from video processor 108. At 804, the video processor 108 generates an active source data structure. In some embodiments, such data structure can include information such as a unique identifier, top-left coordinates, width, height, z-index and any other suitable parameter associated with a video source. Following, at 806, pass-through control device 402 appends the source identification of the first video source provided by video processor 108 at 802 to the active sources data structure. At 808, it queries the source database to locate the source identification and saves the resulting record in a source set.

At 810, pass-through control device 402 determines whether the new set is empty. If the new set is empty (e.g., "YES" at 810) then the source identification is added as a new source in the source database. If, however, the new set is not empty (e.g., "NO" at 810) then the source database is updated to reflect the existing source. At 816, pass-through control device 402 determines whether there are additional listed sources received from the video processor 108. If there are more sources listed (e.g., "YES" at 816) then process 800 returns to 806 and appends the new source identification to the active source data structure. If, however, there are no more sources listed (e.g., "NO" at 816) then pass-through control device 402 requests from the video processor 108 a list of sources excluded from the active sources data structure and stores it in a temporary set, M. At 820, pass-through control device 402 appends the source identification of video source 102 listed in the temporary set M to a list of inactive sources. Subsequently, at 822, pass-through control device 402 determines whether there are more inactive sources, including, but not limited to, a source listed in the temporary set M. If pass-through control device 402 determines that the set is not empty (e.g., "YES" at 822) then process 800 returns to 820. If, however, pass-through control device 402 determines that there are no more inactive sources (e.g., "NO" at 822) then process 800 returns to 802 in order to request source information from the video processor 108.

In some embodiments, synchronizing video sources 102 is achieved by determining whether active video sources can be grouped together. For example, in some embodiments, touch input grouping is performed in order to group several tactile inputs on touch input display 104 based on the spatial distance between the tactile or alternate inputs and any other suitable parameter, including, but not limited to, relative display coordinates, size of human digits and/or hands, voice or text-related parameters other parameters, or combinations thereof. Specifically, in some embodiments related to tactile inputs, a touch input group can be a circle of radius r centered around a coordinate of the first tactile input assigned to the group or any other suitable formation. In some embodiments, touch or alternate input grouping can be used to determine the number of users interacting with input device 104.

System Architectures and Implementation
Input System
Components

An input system according to the present invention can be comprised of some or all of the following components:
Display(s): One or more displays, manufactured using a display technology, including, but not limited to, Liquid Crystal Display (LCD), Laser Phosphor Display (LPD), Liquid Crystal on Silicon (LCoS), Digital Light Processing (DLP), or Cathode Ray Tube (CRT). In certain embodiments, the display will be a touchscreen display. As non-limiting examples, a touchscreen display can be a front or rear throw projector in combination with a light reflecting screen, or assembled into a backlit panel, as in most televisions. In certain embodiments, the input system can be activated, as non-limiting examples, through audio, text, or other alternate methods.

Input Device(s): One or more input devices, either assembled with, or overlaid on top of a Display. In certain embodiments, the input devices will be a touch-input device. The systems described herein can support any available touch-input technology such as Infrared (IR), which is used on large video walls to large-format displays, or Capacitive Sensing, which is used in most smartphones and tablets. In certain embodiments, the input system will permit alternate methods, including, but not limited to, voice or text-input technology. In other embodiments, the input system will combine touch, voice, text, and other methods.

Touchscreen: A Touchscreen is a Touch Input Device associated with one or more Touchscreen Displays. For example, some Touchscreens are a single display panel with a Touch Input Device assembled permanently onto the display. In other embodiments associated with video walls, several display panels are mounted in an array with a single Touch Input Device overlay bounding the entire display array. This relationship is specified in the Software Host during setup and configuration of the system. A system can include several discrete Touchscreens, together or in combination with alternate input devices. operating simultaneously.

Video Processor: Either a general purpose computer or purpose-built device that receives video signals as input and outputs those video signals in different combinations and layouts onto a single continuous raster.

Multimedia Devices: One or more general purpose video output devices including laptops, desktops, tablets, and mobile phones, etc. Some devices that run software Operating Systems (OSs) that implement the HID protocol that can, in certain embodiments, be used to control the device. Multimedia devices that are PCs are also referred to herein as Source PCs.

Software Host: Executes the software algorithms that enable Pass-through Touch Control for Source PCs and dynamic control of the Video Processor through multi-touch.

HID Controller: Communicates the pass-through touch control HID reports to a specific Source PC. There can be as many HID Controllers as Source PCs in a given system. The HID Controller can be either an external plug-and-play hardware device or a software client application hosted on a Source PC.

Control and Data Flow

Figure 9:
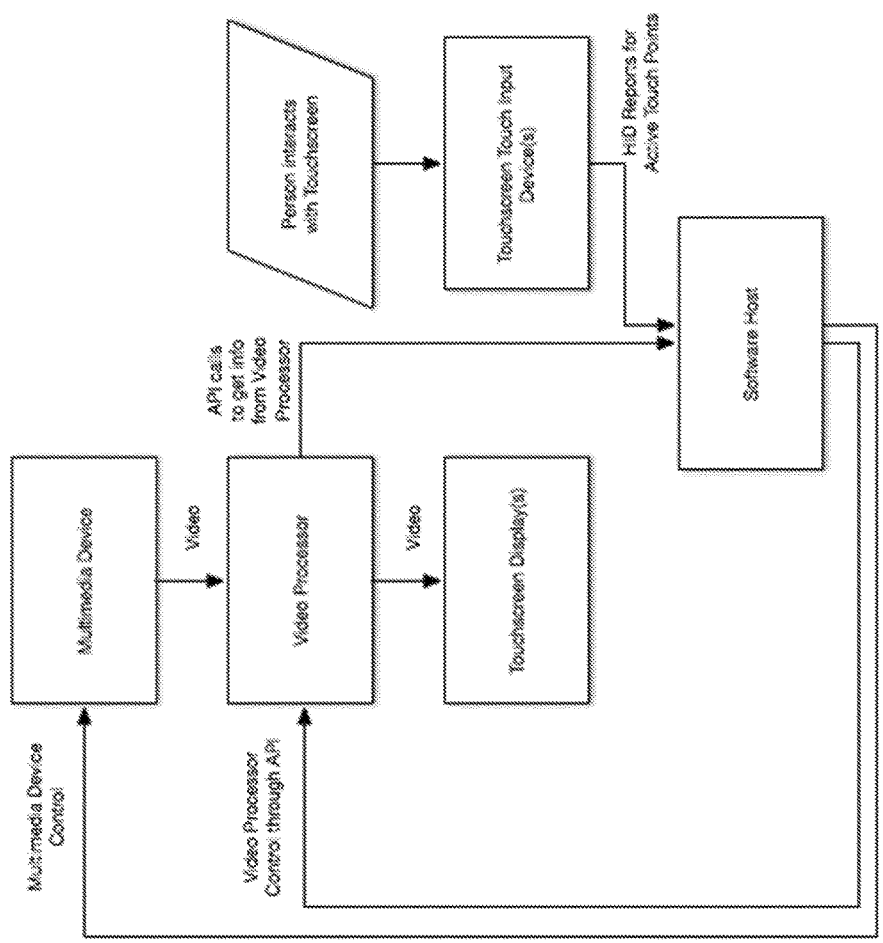
FIG. 9 illustrates an example touchscreen system data flow.

The Touchscreen System's control and data flow is shown in FIG. 9. Video signals from the Multimedia Devices are connected as inputs to the Video Processor using appropriate video cables and/or adapters, or using a wireless video system including, as a non-limiting example, an AirPlay receiver or other wireless video system. In certain embodiments, those videos signals are subsequently dynamically combined onto a single raster by the Video Processor, and shown on the Touchscreen Displays.

When a user provides an input, whether through Touchscreen, text, voice, an alternate method, or some combination thereof, its Input Device communicates the coordinates for where the user is providing the input to the Software Host using the Human Interface Device (HID) protocol. The HID reports for active input points flows through either a serial or USB cable to the Software Host's hardware depending on the Input Device's design. The details of how the Software Host processes incoming HID reports from Touch or alternate Input Devices are described elsewhere herein.

The Software Host synchronizes with the Video Processor through the processor's API as described elsewhere herein. The API calls can be implemented using many communication protocols including network protocols such as http or telnet, and/or integrated within the Software Host software itself using a provided software development kit (SDK).

The Software Host processes the touch or alternate input and determines what action should be taken. This functionality is described in detail elsewhere herein. For example, a user can perform a touch gesture or provide a voice or text input to open a system menu of commands somewhere on the raster. The menu of commands includes a feature to add a video source to the Touchscreen raster. Selecting the option to add a chosen video source initiates a Video Processor API call made by the Software Host that adds a window to the Video Processor output raster and the window contains a Multimedia Device's output video signal.

From there, in certain embodiments with tactile inputs, the user can use a single finger to touch within the Multimedia Device's window to control the device through touch. For Source PC's, a HID Controller, either hardware or software, as described elsewhere herein can be used to facilitate this functionality. Other possibilities for control of devices is described elsewhere herein.

Input System Component Configurations

The different components of the Input System, including, but not limited to, a Touchscreen System described elsewhere herein are physically implemented in different configurations based on feasibility of the different components available for purchase through commercial channels.

Combining the Displays and Input Devices

In certain embodiments related to tactile inputs, configurations of the system use a set of Touchscreen Displays mounted in an array that has an overlaid Touch Input Device bounding the sides of the array. In alternate embodiments related to tactile inputs, configurations call for a single Touchscreen Display with a single Touchscreen Input Device assembled over the display by the manufacturer.

Combining the Video Processor and Software Host Hardware

Video processors such as, for example, the Datapath VSN & iolite series, or other computers that are assembled with video capture input and graphics output cards, can serve as home to the Software Host applications. These types of video processors run on widely available operating systems that can also execute the Software Host applications described below. In certain instances, the Video Processor and Software Host hardware can be combined to save on upfront and maintenance costs of the hardware.

In some cases, the Video Processor and Software Host hardware can be separated. One example configuration can include the Christie Digital Spyder X20 Video Processor or the RGB Systems line of video processors such as the Media Wall series. As non-limiting examples, with a Spyder or Media Wall, the Software Host can be on a separate general computing device.

Combining the Displays and Video Processor Hardware

In many cases, several video source inputs can be shown in different layout configurations. For instance, a single source can be shown full-screen; the display can show two sources simultaneously side-by-side; or in some cases four sources can be shown simultaneously in a quad-view layout. Even more source-to-layout configurations can be implemented by displays.

The display can then be controlled through a RS232 or ethernet interface. In AV environments, this control interface can be used to control basic functionality such as volume and channel control, and it can also be used to control what sources/layouts the display is showing.

In some embodiments, source layouts and control can be considered a subset of the functionality of most Video Processors. Using a Display as the Video Processor in the Touchscreen System described herein can save upfront and maintenance costs versus using a separate piece of Video Processor hardware.

Combining the Input system, Video Processor, and Software Host

Displays can be integrated with general computing devices, or provide the ability to add after-market general computing devices to the display. For instance, the Open Pluggable Specification is an initiative by Intel to provide a common interface between a computer and a display.

In certain embodiments using Touchscreens and Touch Input Devices, the Touchscreen System components may have a single piece of equipment that serves as four of the components of the system: the Touchscreen Display, the Touch Input Device, the Video Processor, and the Software Host.

Software Host

Software Host Algorithms Overview

Figure 10:
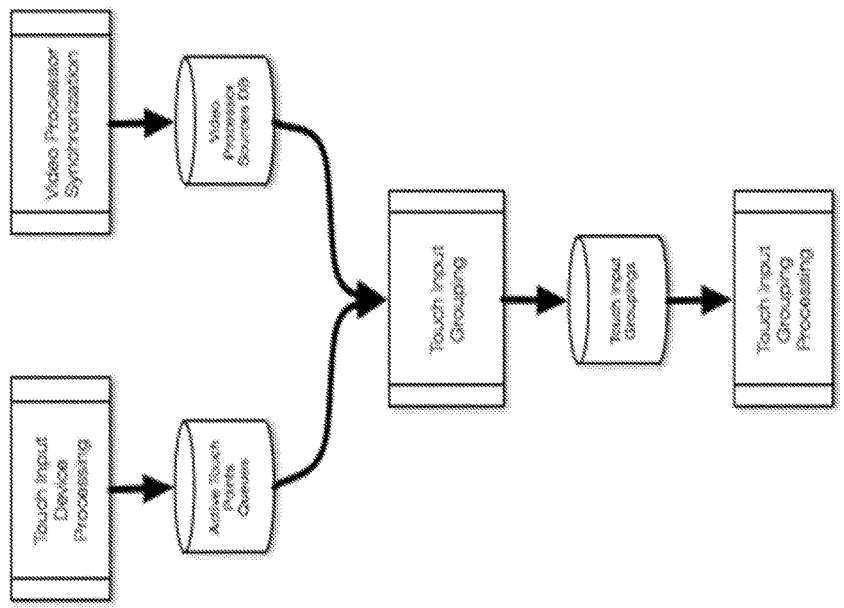
FIG. 10 illustrates an example software host algorithm.

The Software Host uses processing threads, as shown in FIG. 10, to continuously update and react to new touch or alternate inputs. Example threads are described.

Input Device Processing

The Input Device Processing thread, in embodiments related to Touch Inputs, reads incoming HID reports from the Touch Input Devices over USB or serial. One or more Touch Input Devices can have an associated queue of Active Touch Points that is continually updated by this thread. In certain embodiments, one or more touch points are represented by a unique identifier given by the Touch Input Device, and an associated pair of (x,y) coordinates representing where the touch occurred within the Touch Input Device's frame.

Figure 11:
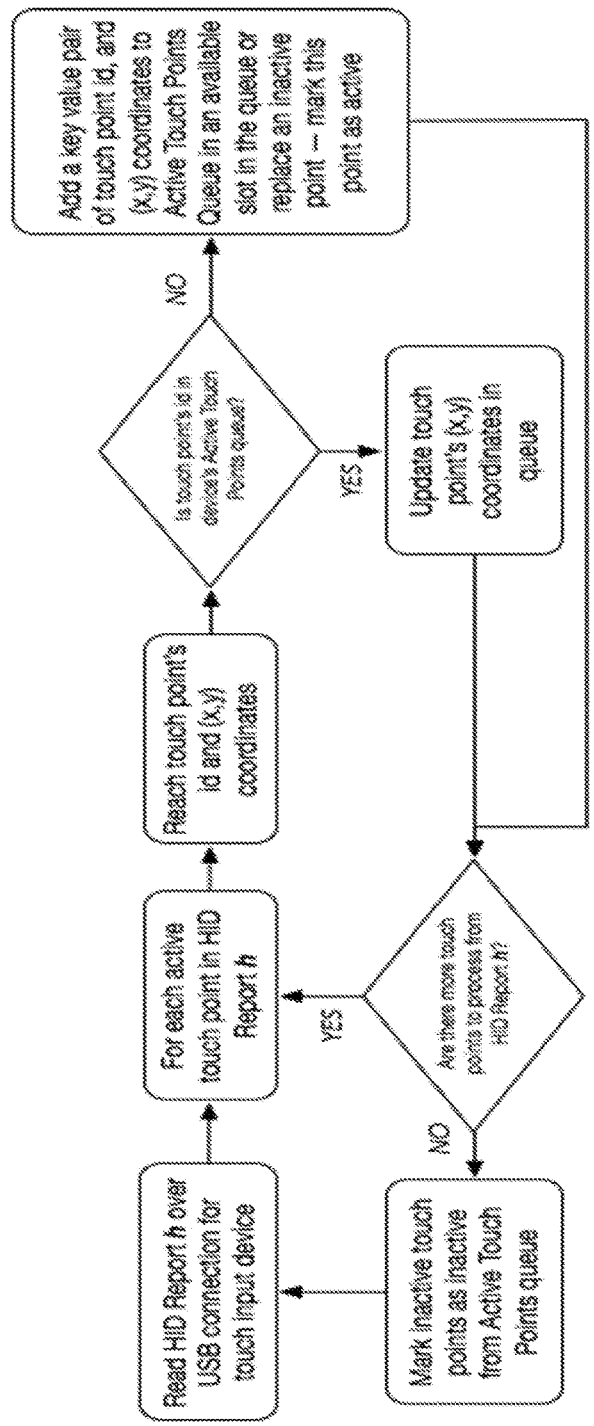
FIG. 11 illustrates an example method for touch or alternate input device processing.

As incoming HID reports are read from a device, one or more touch points in the HID reports are either added or updated within the Active Touch Points queue for that device as shown in FIG. 11.

Video Processor Synchronization

Figure 12:
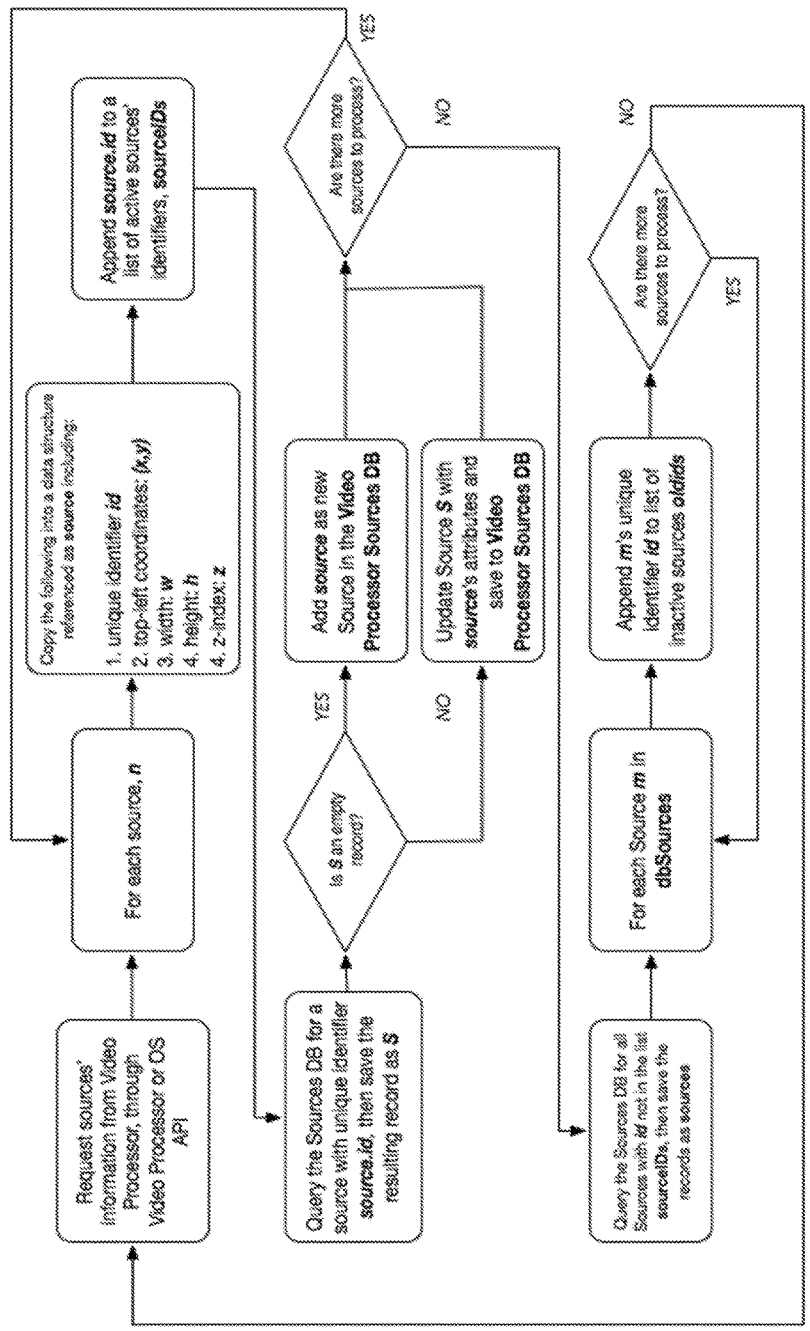
FIG. 12 illustrates an example method for video processor source synchronization.

The video processor synchronization algorithm is responsible tracking source information in real-time in a datastore. An example method for video processor source synchronization is illustrated in FIG. 12. Sources can have a unique identifier, a top-left starting position kept in (x,y) coordinate pair, width, height, and z-index attributes to represent the relative positions of the source window display within the larger raster.

The Video Processor provides information about its sources and if a source has been added to the raster, the algorithm will add a corresponding source in its datastore and update a source if necessary. When a source is removed from the raster, it is removed from the datastore.

Input Grouping

In embodiments using Touch Inputs, the Touch Input Grouping thread scans the Active Touch Points Queues to group touch inputs based on the time and spatial distance between the touch points. The invention described herein uses this approach as a heuristic to group inputs by the approximate size of a hand. In alternate embodiments, inputs will be grouped based, as a non-limiting example, on time between the points In embodiments using Touchscreens, When a system is configured, the user can enter the physical dimensions in inches or meters of the Touchscreen's area.

Grouping can be used to ignore unintentional gestures or inputs of two or more people interacting with a given Multimedia Device window at a time. As a non-limiting example, suppose a Touchscreen is 120" inches in its diagonal, with one Source PC window full screen on the Touchscreen. Two adults can easily stand in front of the display and interact with the PC at the same time. If one of the two users touch with one finger, then move towards the other on a diagonal, a system without Touch Input Grouping would recognize this gesture as a pinch gesture and might make the window smaller, even though that was unintended by the users.

A Touch Input Group can be defined as a set of touch points that are within a certain geometrical boundary on the screen and that takes into consideration additional parameters such as the relative screen coordinates, the physical measurements of the screen and the size of the human digits and/or hands. For example, one implementation of a touch input group can include a circle with radius r, centered around the first touch point that creates the group. In addition, a group can include one or more touch points. The radius r is specified in real measurement based on the physical dimensions (i.e. inches or meters instead of pixels) of the Touchscreen system, which is configurable by a user.

Figure 13:
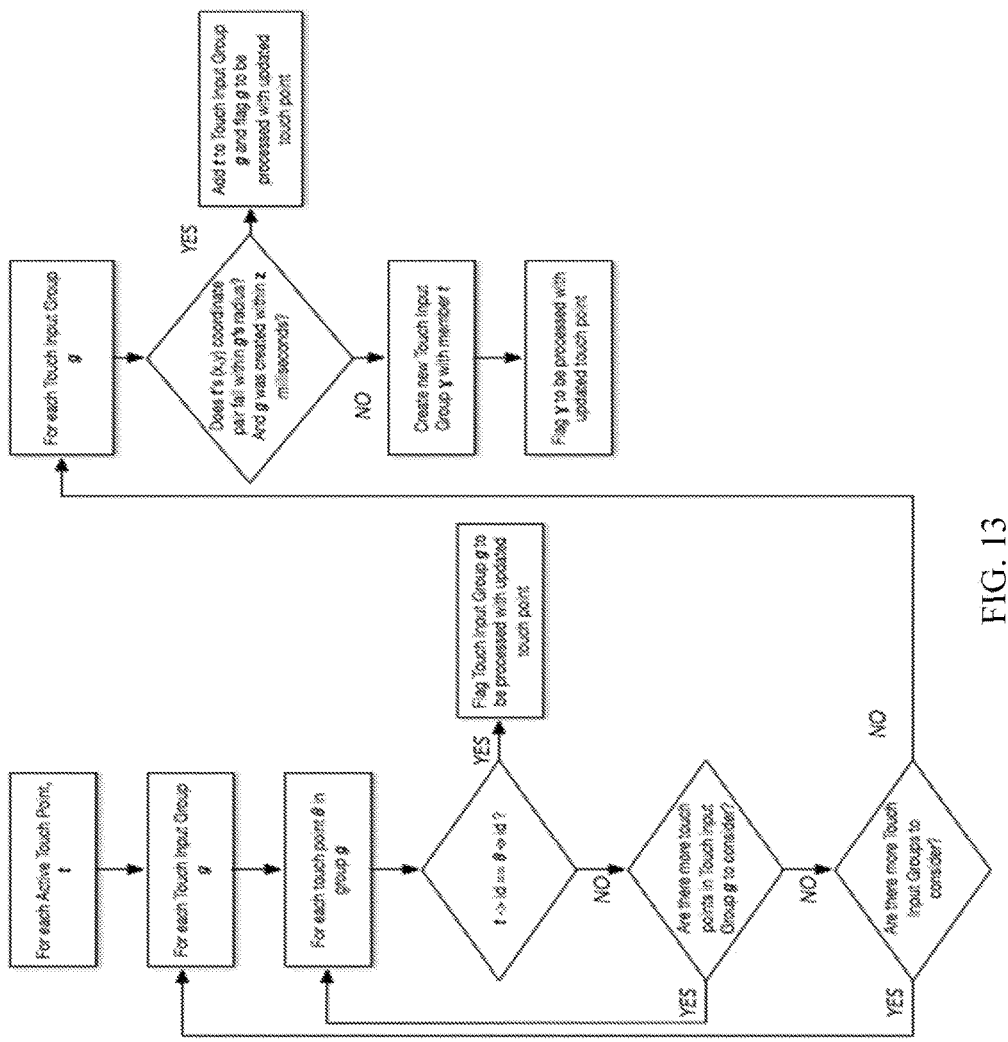
FIG. 13 illustrates an example method for touch or alternate input grouping.

The Touch Input Grouping process is shown in FIG. 13. For a touch point t, the Touch Input Grouping thread will first check to see if t is already in a group. If so, the group will be flagged for processing as described elsewhere herein.

If t is not already in a group, the algorithm will determine the t's (x,y) coordinates lie within a previously created group, and if that group was created within a timeout z in milliseconds, typically 50 milliseconds, from when the group was first seen by the Touch Input Grouping thread.

If so, t will be added to that group and that group will be flagged for processing. If not, the thread will create a new group centered around t, with radius r, and will note the time the group is created.

Input Group Processing

Figure 14:
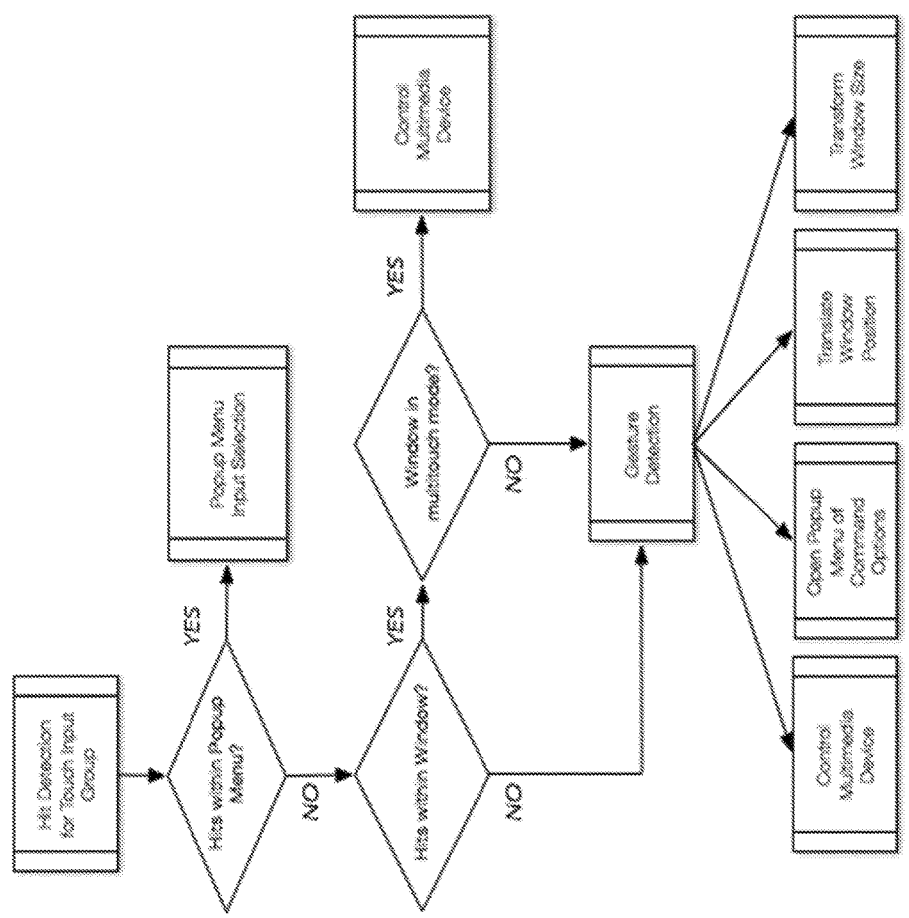
FIG. 14 illustrates an example method for touch or alternate input group processing.

An Input Group, which may, in certain embodiments, be a Touch Input Group, can be processed as shown in FIG. 14. Basic hit detection is used to determine whether the input is trying to interact with a popup menu of options, a video source window on the Video Processor output, or with the background canvas.

Figure 15:
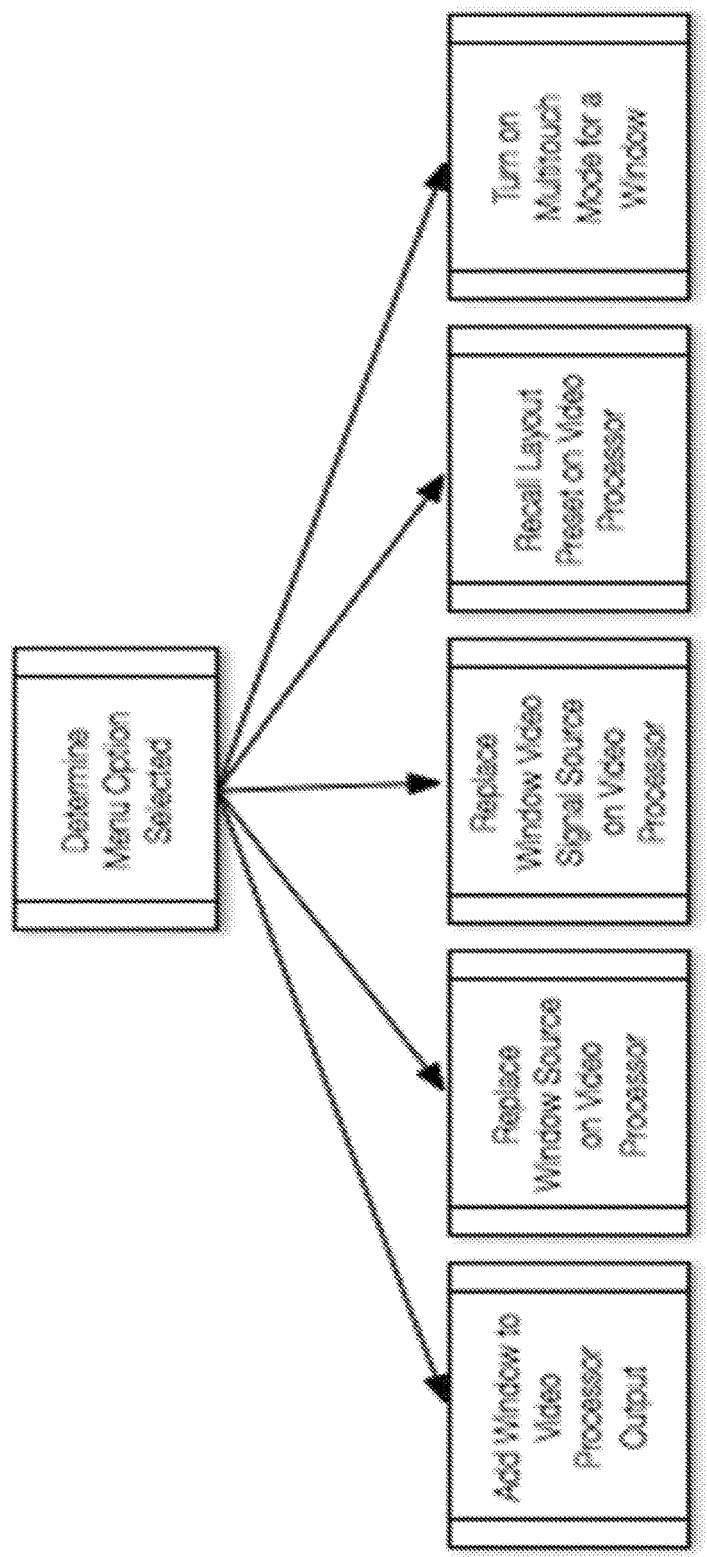
FIG. 15 illustrates an example popup menu input selection.

Example popup menu functionality is shown in FIG. 15. The popup menu application is implemented as a separate application running alongside the Software Host and shares several resources with the Software Host to coordinate behavior between the two applications.

For example, when a user selects an option in the popup menu, the menu disappears and dispatches a message to the Software Host to carry out the action the user selected. Also, the Software Host dictates which options are available in the menu when it appears.

Figure 16:
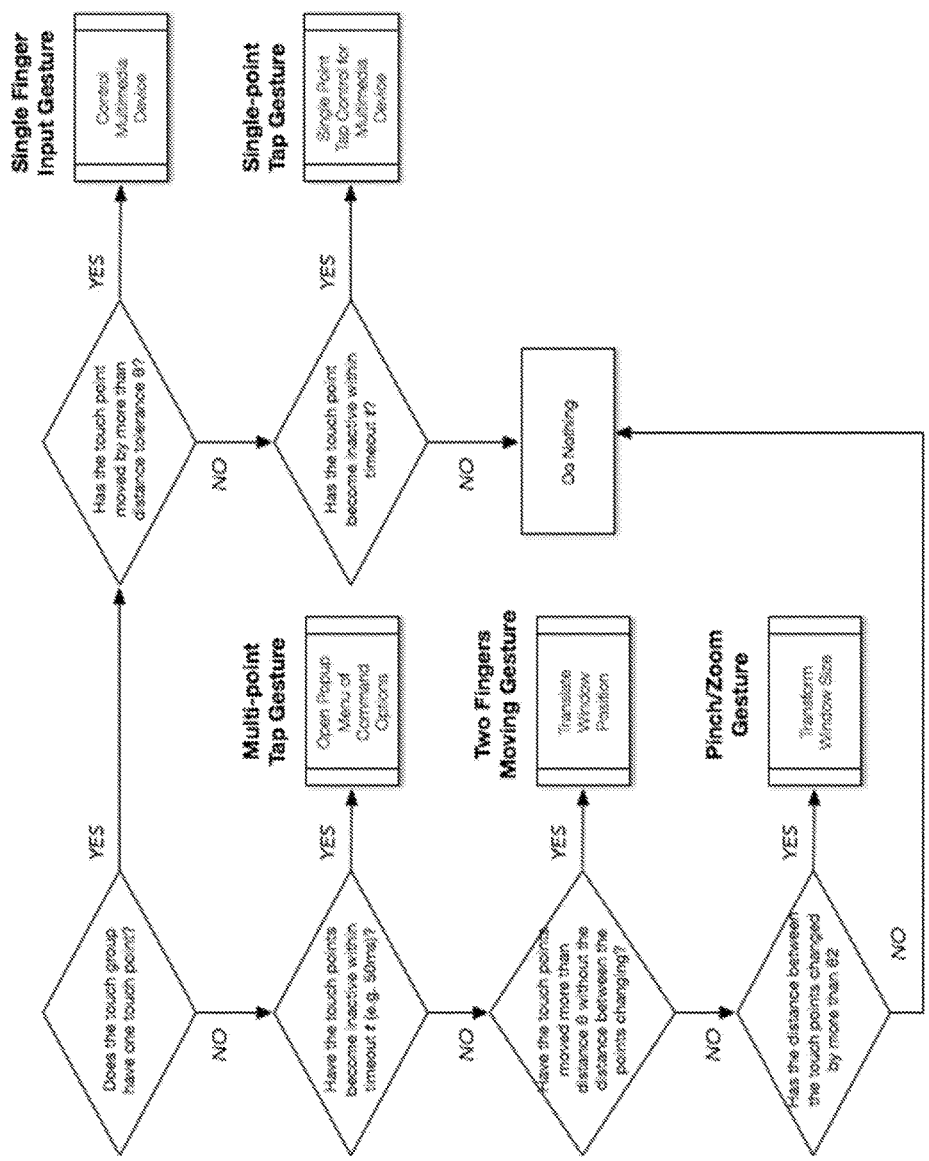
FIG. 16 illustrates an example method for gesture detection.

In certain embodiments, if a touch group hits within a window, a user is trying to interact with that window. If the window is not in multitouch mode, the user's input is analyzed using the gesture detection algorithm in FIG. 16 to determine what actions, if any, should be performed.

If the window is in multitouch mode, in some cases activated in the popup menu, touch input within the window will be passed through to control the multimedia device.

Control Interfaces for Multimedia Devices

With Multitouch Mode ON for a source window (see FIG. 15), or with either a Single Finger Input or Single-point Tap gesture a user can control the Multimedia Device through touch with the system.

During configuration of a system, a source is associated with a particular Control Interface class or subclass, which interprets the gestures from the Touchscreen and in turn executes some command to control on the Multimedia device.

In some embodiments, a new Multimedia Device to be controlled in the system can utilize a new Control Interface subclass, based in whole or in part on similar command communication structures as described elsewhere herein. For instance, many devices use an Internet Protocol (IP) Control Interface, while one or more of the devices can have its own unique functionality and IP based commands to execute to control the device.

Source PCs with HID Control Interface

Source PCs are typically controlled through a HID Control Interface, paired with a HID Controller connected to the Source PC as described elsewhere herein. In this case, the Software Host's HID Control Interface is responsible for communicating the HID reports to the HID Controller, through TCP/IP to eventually be executed on the Source PC as actual HID reports.

The Software Host translates the touch or alternate point coordinates from the larger Touchscreen or alternate input system to the appropriate relative coordinates where someone is touching or alternate inputs within the Source PC's window on the Touchscreen. As a non-limiting example, if a user is touching the top-left corner of the Source PC window, the window may be anywhere on the larger Touchscreen, but the appropriate coordinate to pass to the Source PC would be (0,0). The HID Controllers can be configured to work on most modern Operating Systems including: Windows, macOS, Linux, Android, and other devices.

Multimedia Devices with Infrared Control Interface

Video players such as Blu-Ray, DVD, Laserdisc, etc. are controlled through an Infrared (IR) Control Interface, wherein an IR emitter is integrated into the Software Host's hardware and emits commands as controlled by one of the many Software Host's Infrared Control Interface subclasses based on the device.

Multimedia Devices with Internet Protocol Control Interface

Cameras are another example multimedia devices that can be used in the system, typically in control room environments. These devices are controlled through an Internet Protocol (IP) Control Interface.

As a non-limiting example, a user touching a PTZ (point, tilt, zoom) camera's source window can dynamically control the direction the camera is pointing. In certain embodiments, a user touching a point within the camera's output display will move the camera in the direction where the user is touching, relative to the center of the window. When that user double taps on a point, the camera zooms in on that point.

Another multimedia device used in the system is a Video Conferencing Codec. These devices will show a video conferencing video signal and the device can be controlled through an IP interface. For example, a user can start or stop a call by tapping within the window.

HID Controller for Source PC Control

Software Application

The Software HID Controller is a user-space application that communicates with a virtual device in a given Source PC's operating system. Depending on the operating system's framework, the virtual device is implemented differently at the kernel level to communicate the pass-through touch HID reports to the operating system.

The user space application functions as a server listening for TCP/IP packets of containing HID report information from the Software Host. Then the application translates that TCP/IP data into actual HID reports that is passed to its virtual device to perform the HID commands on the Source PC just as a physical device would.

Hardware Device

The Hardware HID Controller can be a general purpose computing device that has two primary connection interfaces, incoming and outgoing.

The incoming interface can be implemented using ethernet or USB hardware. It receives data representing HID reports from the Software Host. In the case of a ethernet interface, the HID Controller can be connected to the same public or private ethernet network as the Software Host's hardware. The network connections should where possible be implemented using TCP/IP protocol for correctness but can also be implemented using UDP as well.

The incoming HID reports are represented by TCP/IP packets and can be converted to into actual HID reports by the HID Controllers CPU to be sent through the HID Controller's outgoing interface.

When the incoming interface of the HID Controller is implemented in USB hardware, translation of network packets to is not required. However, the HID Controller can be directly connected to the Software Host's hardware using a USB cable.

The outgoing interface can be implemented using a USB chipset. In some embodiments, the chipset functions as a USB Device and not as a USB Host. Many, if not all HID devices including keyboards, mice, and Touch Input Devices are built using USB Device chips. This gives the hardware HID Controller plug-and-play functionality with a Source PC, without the need for installing software on the Source PC, a feature in secure information technology environments. In some instances, a hardware HID Controller is implemented using an IBoard Ex Arduino board that uses an Atmel ATMega32U4 RISC-based microcontroller as its CPU. The Atmel chip has a USB controller integrated into the chip that can act as a USB Device or USB Host.

The board can be configured so that the Atmel chip acts as USB Device. The system uses the IBoard's WizNET ethernet port to receive TCP/IP packets that are processed by the microcontroller using custom software we have written for the HID Controller's incoming interface. The TCP/IP packets are translated and sent as HID reports through the outgoing interface on the IBoard's USB Device connection to a Source PC. The Hardware HID Controller is powered by the same USB connection to the Source PC using a USB A-to-B mini cable.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the various embodiments depicted and claimed, the disclosed subject matter is also directed to other embodiments having any other possible combination of the features disclosed and claimed herein. As such, the particular features presented herein can be combined with each other in other manners within the scope of the disclosed subject matter such that the disclosed subject matter includes any suitable combination of the features disclosed herein. Thus, the foregoing description of specific embodiments of the disclosed subject matter has been presented for purposes of illustration and description. It is not intended to be exhaustive or to limit the disclosed subject matter to those embodiments disclosed.

The embodiments described herein can employ various computer-implemented operations involving data stored in computer systems. For example, these operations can require physical manipulation of physical quantities; usually, though not necessarily, these quantities can take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure can be useful machine operations. In addition, one or more embodiments of the disclosure also relate to a device or an apparatus for performing these operations. The apparatus can be specially constructed for specific required purposes, or it can be a general purpose computer selectively activated or configured by a computer program stored in the computer. In particular, various general purpose machines can be used with computer programs written in accordance with the teachings herein, or it can be more convenient to construct a more specialized apparatus to perform the required operations.

In the claims, elements do not imply any particular order of operation, unless explicitly stated in the claims. In general, structures and functionality presented as separate components in exemplary configurations can be implemented as a combined structure or component. Similarly, structures and functionality presented as a single component can be implemented as separate components. These and other variations, modifications, additions, and improvements can fall within the scope of the appended claim(s).

It will be apparent to those skilled in the art that various modifications and variations can be made in the method of the disclosed subject matter without departing from the spirit or scope of the disclosed subject matter. Thus, it is intended that the disclosed subject matter include modifications and variations that are within the scope of the appended claims and their equivalents.

The invention claimed is:

1. A system for pass-through control in interactive devices, adapted to receive a plurality of video signals from a plurality of video sources from respective computing devices, the system comprising:
   one or more display screens arranged in a matrix configured to receive and output a combined video signal;
   one or more tactile input devices, coupled to the one or more display screens in the matrix and configured to receive at least one tactile input; and
   a video processor, configured to receive the plurality of video signals from the plurality of video sources and coupled to the one or more display screens arranged in a matrix, wherein the processor comprises a control module configured to:
   determine whether a source from the plurality of sources is associated with the at least one tactile input, and upon said determination:
   if the at least one tactile input is associated with a displayed video source, then transmit one or more commands associated with the tactile input to the respective computing device;
   if the tactile input is not associated with a displayed video source, then identify whether or not the tactile input represents a command to the video processor, and wherein the control module activates one or more system commands upon determining that the tactile input is a video processor command;
generate the combined signal based on the plurality of video signals; and
transmit the combined signal to the one or more display screens arranged in the matrix.

2. The system of claim 1, further comprising a controller coupled to the video processor and configured to generate at least one report associated with the at least one input.

3. The system of claim 1, further comprising determining if the at least one tactile input is associated with a displayed video source or represents a command to the video processor by determining a proximity of the at least one tactile input to a displayed video source signal.

4. The system of claim 1, further comprising determining if the at least one tactile input is associated with a displayed video source or represents a command to the video processor by determining a number of fingers that are simultaneously touching per-hand.

5. The system of claim 1, further comprising:
a first storage medium coupled to the controller and configured to store the at least one report; and
a second storage medium coupled to the processor and configured to store a set of parameters associated with the plurality of source computers.

6. The system of claim 1, further comprising determining if the at least one tactile input is associated with a displayed video source or represents a command to the video processor by evaluating whether the at least one tactile input moves faster than a set threshold of space and time.

7. The system of claim 1, wherein the video processor is embedded to the one or more screens.

8. The system of claim 1, wherein the control module is further configured to receive a first set of parameters associated with the at least one tactile input and generate a second set of parameters associated with the at least one tactile input and a size of the one or more screens.

9. A method for pass-through control in interactive devices, adapted for receiving a plurality of video signals from a plurality of video sources from respective computing devices, the method comprising:
logically arranging one or more display screens in a matrix configured to receive and output a combined video signal;
configuring one or more tactile input devices, coupled to the one or more display screens in the matrix to receive at least one tactile input; and
configuring a video processor to receive the plurality of video signals from the plurality of video sources and communicate with the one or more display screens arranged in a matrix, wherein the processor is further configured for:
determining whether a source from the plurality of sources is associated with the at least one tactile input, and upon said determination:
if the at least one tactile input is associated with a displayed video source, then transmitting one or more commands associated with the tactile input to the respective computing device;
if the tactile input is not associated with a displayed video source, then identifying whether or not the tactile input represents a command to the video processor, and activating one or more system commands upon determining that the tactile input is a video processor command;
generating the combined signal based on the plurality of video signals; and
transmitting the combined signal to the one or more display screens arranged in the matrix.

10. The method of claim 9, further comprising:
receiving a first set of parameters associated with the at least one tactile input; and
generating a second set of parameters associated with the at least one tactile input and a size of the one or more display screens.

11. The method of claim 9, further comprising at least one input that is text, voice, algorithmic, or non-tactile.

12. The method of claim 9, wherein the at least one input is tactile, and the input device is a touch-input device.

13. The method of claim 9, further comprising determining if the at least one tactile input is associated with a displayed video source by determining a proximity of the at least one tactile input to a displayed video source signal.

14. The method of claim 9, further comprising determining if the at least one tactile input is associated with a displayed video source by determining a number of fingers that are simultaneously touching per-hand.

15. The method of claim 9, further comprising determining if the at least one tactile input is associated with a displayed video source or represents a command to the video processor by evaluating whether the at least one tactile input moves faster than a set threshold of space and time.

16. A non-transitory computer-readable medium containing computer-executable instructions that, when executed by at least one processor, cause the at least one processor to perform a method for pass-through control in interactive devices, adapted for receiving a plurality of video signals from a plurality of video sources from respective computing devices, the method comprising:
logically arranging one or more display screens in a matrix configured to receive and output a combined video signal;
configuring one or more tactile input devices, coupled to the one or more display screens in the matrix to receive at least one tactile input; and
configuring a video processor to receive the plurality of video signals from the plurality of video sources and communicate with the one or more display screens arranged in a matrix, wherein the processor is further configured for:
determining whether a source from the plurality of sources is associated with the at least one tactile input, and upon said determination:
if the at least one tactile input is associated with a displayed video source, then transmitting one or more commands associated with the tactile input to the respective computing device;
if the tactile input is not associated with a displayed video source, then identifying whether or not the tactile input represents a command to the video processor, and activating one or more system commands upon determining that the tactile input is a video processor command;
generating the combined signal based on the plurality of video signals; and
transmitting the combined signal to the one or more display screens arranged in the matrix.

17. The non-transitory computer-readable medium of claim 16, further comprising determining if the at least one tactile input is associated with a displayed video source by determining a proximity of the at least one tactile input to a displayed video source signal.

18. The non-transitory computer-readable medium of claim 16, further comprising determining if the at least one tactile input is associated with a displayed video source by determining a number of fingers that are simultaneously touching per-hand.

19. The non-transitory computer-readable medium of claim 16, further comprising determining if the at least one tactile input is associated with a displayed video source or represents a command to the video processor by evaluating whether the at least one tactile input moves faster than a set threshold of space and time.

* * * * *